United States Patent
Heumesser et al.

(10) Patent No.: US 8,856,341 B2
(45) Date of Patent: Oct. 7, 2014

(54) BALANCING MANAGEMENT DUTIES IN A CLOUD SYSTEM

(75) Inventors: Roland Heumesser, Rottenburg (DE); Jörn Schimmelpfeng, Herrenberg (DE); Carsten Schlipf, Gaeufelden (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 215 days.

(21) Appl. No.: 13/485,079

(22) Filed: May 31, 2012

(65) Prior Publication Data

US 2013/0326036 A1    Dec. 5, 2013

(51) Int. Cl.
G06F 15/173    (2006.01)
(52) U.S. Cl.
USPC .......................................... 709/226; 709/223
(58) Field of Classification Search
CPC .............. H04L 29/08144; H04L 29/06; H04L 29/08072; H04L 29/08171; H04L 12/5695
USPC ........................................................ 709/226
See application file for complete search history.

(56) References Cited

U.S. PATENT DOCUMENTS

| | | | |
|---|---|---|---|
| 6,909,692 B1 * | 6/2005 | Sharma et al. | 370/232 |
| 7,630,877 B2 | 12/2009 | Brown et al. | |
| 7,684,876 B2 | 3/2010 | Grgic | |
| 8,296,434 B1 * | 10/2012 | Miller et al. | 709/226 |
| 2010/0268764 A1 | 10/2010 | Wee et al. | |
| 2011/0145836 A1 * | 6/2011 | Wheeler et al. | 719/314 |
| 2011/0154367 A1 | 6/2011 | Gutjahr et al. | |
| 2011/0246627 A1 * | 10/2011 | Kern | 709/220 |
| 2012/0284384 A1 * | 11/2012 | Shi et al. | 709/223 |
| 2013/0262556 A1 * | 10/2013 | Xu et al. | 709/202 |

OTHER PUBLICATIONS

Andreolini, M., et al. "Dynamic Load Management of Virtual Machines in a Cloud Architectures." <http://weblab.ing.u.nimo.it/papers/cloudcomp09.pdf> on pp. 201-214; vol. 34. Oct. 2009.

You, G., et al. "Scalable Load Balancing in Cluster Storage Systems." <http://ids.postech.ac.kr/papers/Ursa.pdf> on pp. 101-122; vol. 7049. Dec. 2011.

* cited by examiner

Primary Examiner — Abdullahi Salad

(57) ABSTRACT

A method for balancing management duties in a cloud system can include determining a relationship between a number of configuration items (CI) in a cloud system. The number of CIs are grouped into a number of cluster levels based on the relationship of the number of CIs. To balance management duties in the cloud system, one of the number of cluster levels is assigned to a management cloud server based on a capacity of the management cloud server.

15 Claims, 4 Drawing Sheets

```
100
```

```
┌─────────────────────────────────────────────────────────────┐
│ DETERMINING A RELATIONSHIP BETWEEN A NUMBER OF CONFIGURATION│──102
│           ITEMS (CI) IN A CLOUD SYSTEM                      │
└─────────────────────────────────────────────────────────────┘
                              │
┌─────────────────────────────────────────────────────────────┐
│  GROUPING THE NUMBER OF CIs INTO A NUMBER OF CLUSTER LEVELS │──104
│      BASED ON THE RELATIONSHIP OF THE NUMBER OF CIs         │
└─────────────────────────────────────────────────────────────┘
                              │
┌─────────────────────────────────────────────────────────────┐
│         ASSIGNING ONE OF THE NUMBER OF CLUSTER LEVELS       │
│     TO A MANAGEMENT CLOUD SERVER BASED ON A CAPACITY        │──106
│         OF THE MANAGEMENT CLOUD SERVER IN ORDER TO          │
│       BALANCE MANAGEMENT DUTIES IN THE CLOUD SYSTEM         │
└─────────────────────────────────────────────────────────────┘
```

BALANCING MANAGEMENT DUTIES IN A CLOUD SYSTEM

BACKGROUND

A cloud system can refer to computational resources that can be linked through the use of computer networks. Example cloud systems can include a public cloud system, a private cloud system, and a hybrid cloud system. A hybrid cloud system, for example, can include a composition of two or more cloud systems that can remain unique but may be bound together.

DETAILED DESCRIPTION

Figure 1:
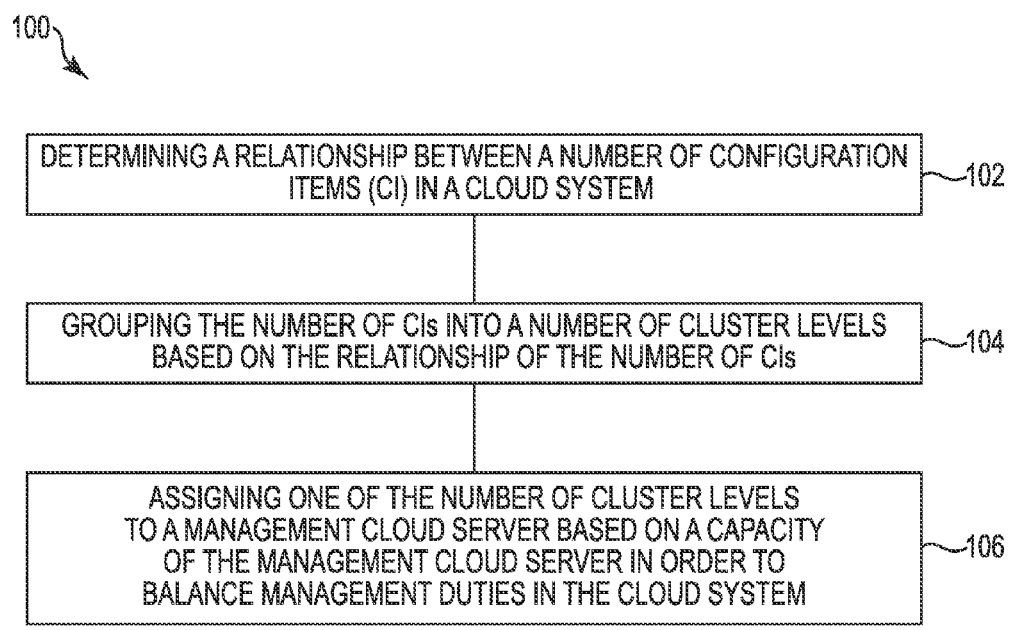
FIG. 1 illustrates a flow chart of an example method for balancing management duties in a cloud system according to the present disclosure.

With increasing adaptation of cloud systems to run workloads, various enterprises (e.g., business and organization) may seek to decrease cost by using resources in a hybrid cloud system. A hybrid cloud system can include a private cloud system bound together with a public cloud system. For example, a hybrid cloud system can be formed by a vendor with a private cloud forming a partnership with a public cloud provider and/or by a pubic cloud provider forming a partnership with a vendor that provides private cloud platforms. A hybrid cloud system can be advantageous for an enterprise by providing the flexibility of in-house applications with the fault tolerance and scalability of cloud based services.

It can be useful to monitor all elements in a hybrid cloud system for management of the elements in the hybrid cloud system. A detected problem (e.g., operating system failure and application failure) in the hybrid cloud system can be reported as a management event. A management event, for example, can be reported to central management of an enterprise to take action. A management cloud server can be used to process data related to a management event including detection and root cause analysis, for example. A management cloud server can include a virtual process server associated with a virtual machine in the cloud system. Because of a large volume of management events, it may be useful to spread problems detected across a number of management cloud servers. It may be useful for management events of elements with a close relationship to be distributed to the same management cloud server so that the cause event and system events of each of the reported management events can be processed by the same management cloud server.

Hybrid cloud systems can provide a mix between traditional server systems and cloud server systems. The hybrid cloud environment, for example, can have a high degree of inter dependencies between physically and logically separated services consisting of multiple systems. Balancing management duties in a hybrid cloud system can be divided by geographic area and/or department borders of an enterprise, wherein each part is managed by a management cloud server. However, balancing duties based on geographic and/or department borders can result in duplication of management data across a number of management servers in a cloud system, increased synchronization overhead between servers, higher hardware requirements as a result of poor balancing across servers, and lower stability when the load is not well balanced. In contrast, examples of the present disclosure can distribute and/or balance management duties across a number of management servers in a cloud system without overlaps by balancing the management events based on a correlation of elements in the cloud system.

Examples of the present disclosure include methods, systems, and computer-readable and executable instructions for balancing management dues in a cloud system. One example method for balancing management duties in a cloud system can include determining a relationship between a number of configuration items (CI) in a cloud system; grouping the number of CIs into a number of cluster levels based on the relationship of the number of CIs; and, assigning one of the number of cluster levels to a management cloud server based on a capacity of the management cloud server to balance management duties in the cloud system.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 338 may reference element "38" in FIG. 3, and a similar element may be referenced as 438 in FIG. 4. As will be appreciated, elements shown in the various examples herein can be added, exchanged, and/or eliminated so as to provide a number of additional examples of the present disclosure In addition, as will be appreciated, the proportion and the relative scale of the elements provided in the figures are intended to illustrate the examples of the present disclosure, and should not be taken in a limiting sense. As used herein, the designators "N", "P," "R", and "S" particularly with respect to reference numerals in the drawings, indicates that a number of the particular feature so designated can be included with a number of examples of the present disclosure. Also, as used herein, "a number of" an element and/or feature can refer to one or more of such elements and/or features.

FIG. 1 illustrates a flow chart of an example method 100 for balancing management duties in a cloud system according to the present disclosure. Balancing management duties in a cloud system can include balancing monitoring of elements of an environment (e.g., IT environment, system, and manufacturing environment) across a number of management cloud servers. Elements of an environment can include configuration items (CIs), for example. For instance, CIs can include nodes, databases, and processors, among other network connections.

At 102, a relationship between a number of configuration items (CIs) in a cloud system can be determined. The relationship, for example, can be determined using an event archive and/or a Configuration Management Database (CMDB). The CIs can be stored in a database. For example, a database can include a central CMDB. A CMDB, for instance, can store the CIs and information relating to a relationship between the CIs. A detected problem in a cloud system can be reported as a management event. A management event, for example, can include an information technology (IT) event (e.g., detection of IT problems), a manufacturing event (e.g., detection of manufacturing problems), and a system event (e.g., detection of system problems), among others.

A management event can include a description of the detected problem and can identify CIs that are impacted by the problem (e.g., CIs that are a symptom of the problem). Management events, for example, can be stored in an event database and/or the event archive. An event archive, for instance, can include a number of management databases (e.g., event database and lock file) and can include historical management event data. For instance, historical management event data can include management event data within a threshold period of time (e.g., week, month, and year).

A relationship between the number of CIs can include a number of proximity relationships between each of the number of CIs. In some examples of the present disclosure, the method 100 can include calculating a proximity relationship between each of the number of CIs to determine the relationship, wherein the relationship includes determining related CIs, for instance. For example, a relationship between a first CI and a second CI can include calculating a proximity relationship between the first CI and the second CI.

A proximity relationship can include a number of management events that are related to both the first CI and the second CI and the relationship between the first CI and second CI. A proximity relationship between a first CI and a second CI can include a probability the first CI and the second CI are related to one another (e.g. a percentage of correlated management events between the first CI and the second CI) and a CMDB relationship (e.g. the number of hops between the first CI and the second CI). A proximity relationship can be determined using the function:

$$\text{Proximity}(CI_1, CI_2) = \frac{\text{\# events } CI_1 \text{ and } CI_2 \text{ are correlated}}{\text{total \# of events}} + \frac{1}{\text{\# of hops between } CI_1 \text{ and } CI_2 \text{ in } CMDB}$$

Wherein $CI_1$ is the first CI and $CI_2$ is the second CI. A number of events where $CI_1$ and $CI_2$ are correlated can include a number of management events (e.g., historical events) that relate to both $CI_1$ and $CI_2$. Management events that relate to both $CI_1$ and $CI_2$ can include management events that impact, are associated with, and/or assigned to both $CI_1$ and $CI_2$. For instance, relating to both $CI_1$ and $CI_2$ can include a management event that $CI_1$ and $CI_2$ are correlated as a symptom for the management event (e.g., $CI_1$ and $CI_2$ are symptoms of a detected problem). A total number of events can include a total number of management events in the event archive, for example. A number of hops between $CI_1$ and $CI_2$ in the CMDB can include a number of CIs between $CI_1$ and $CI_2$ in the CMDB.

A short path in the CMDB, for example, may indicate that the CIs are more related than CIs with a long path in the CMDB. For example, a first CI (e.g., a database) that may be connected to a second CI (e.g., a system) in a cloud system may have one hop between the first CI and the second CI because a pathway to the first CI from the second CI includes one hop (e.g., path is from the first CI to the second CI). A first CI (e.g., an application) that may be connected to a second CI (e.g., a hard disk) in a cloud system through a third CI (e.g., a database) connected to a fourth CI (e.g., a system) connected to the second CI may have four hops between the first CI and the second CI because a pathway from the first CI to the second CI includes four hops (e.g., path is from the first CI to the third CI to the fourth CI to the second CI). Using the proximity relationship calculated, a first CI and a second CI with a high proximity relationship compared to a third CI can be assigned to a nearby cluster. The proximity relationship calculated between a first CI and a second CI, for example, can be used to calculate how related (e.g., a probability of being related) the first CI is to the second CI.

At 104, the number of CIs can be grouped into a number of cluster levels based on the relationship of the number of CIs. For example, the number of cluster levels can include a number of hierarchical cluster levels. The number of cluster levels can include a number of increasing levels, wherein each higher level includes more CIs then the level below, for instance. A cluster level, for example, can include a number of clusters of CIs, wherein each cluster in the cluster level has a similar probability of being related based on the calculated relationship. For instance, if a first cluster level includes a first cluster and a second cluster, the CIs in the first cluster and second cluster may have a similar probability of being related to one another. Each cluster, for instance, can include a number of CIs.

At 106, one of the number of cluster levels can be assigned to a management cloud server based on a capacity of the management cloud server in order to balance management duties in the cloud system. In an example of the present disclosure, one of the number of cluster levels can include more than one cluster level. A capacity of the management cloud server can include a management event rate the management cloud server can process (e.g., is capable of processing) and a management event capacity of the management cloud server. A management event rate can include, for example, a number of management events (e.g., IT events, manufacturing events, and system events) in a given period of time. For instance, assigning one of the number of cluster levels can include distributing management events related to the CIs in the cluster level to the management cloud server. Thereby, assigning one cluster level can include distributing management events of related CIs to the management cloud server (e.g., to the same management cloud server).

In various examples of the present disclosure, assigning a cluster level can include determining a capacity of the management cloud server. For example, a capacity can include a management event rate the management cloud server can process. In some examples, the capacity of the management cloud server can be compared to a management event rate (e.g., total management event rate) for each of the number of cluster levels. A management event rate for each of the number of cluster levels, in some examples of the present disclosure, can be calculated using the event archive.

For example, using the event archive, a management event rate for a cluster level can be calculated by totaling a historical number of management events for all of the CIs associated with the cluster level (e.g., the total number of detected problems that impacts one of the number of CIs in the cluster level). For instance, the cluster level can be assigned based on the management event rate for the cluster level and the capacity of the management cloud server. A cluster level with the highest rate can be assigned to the management cloud server, wherein the highest rate of the assigned cluster level is less than the capacity of the management cloud server.

In some examples of the present disclosure, the method 100 can include determining a management event rate to manage the number of CIs. A management event rate to manage the number of CIs can include a historical management event rate for all of the number of CIs. For example, using the event archive, a historical management event rate can be determined for all of the number of CIs by totaling the number of management events for all of the CIs (e.g., the total number of detected problems that impacts one of the number of CIs in the event archive). The management event rate to manage the number of CIs can be compared to a total management event capacity of the number of management cloud servers. A total management event capacity of the number of management cloud servers can include a sum of the capacity of each of the number of management cloud servers. In response to determining the total management event capacity of the number of management cloud servers is less than the management event rate to manage the number of CIs, a virtual machine with a process server (e.g., management cloud server) can be automatically created. The virtual machine, for example, can include a new virtual machine.

In various examples of the present disclosure, in response to determining the total management event capacity of the number of management cloud servers is more than the management event rate to manage the number of CIs, an associated virtual machine with a process server can be automatically removed.

Figure 2:
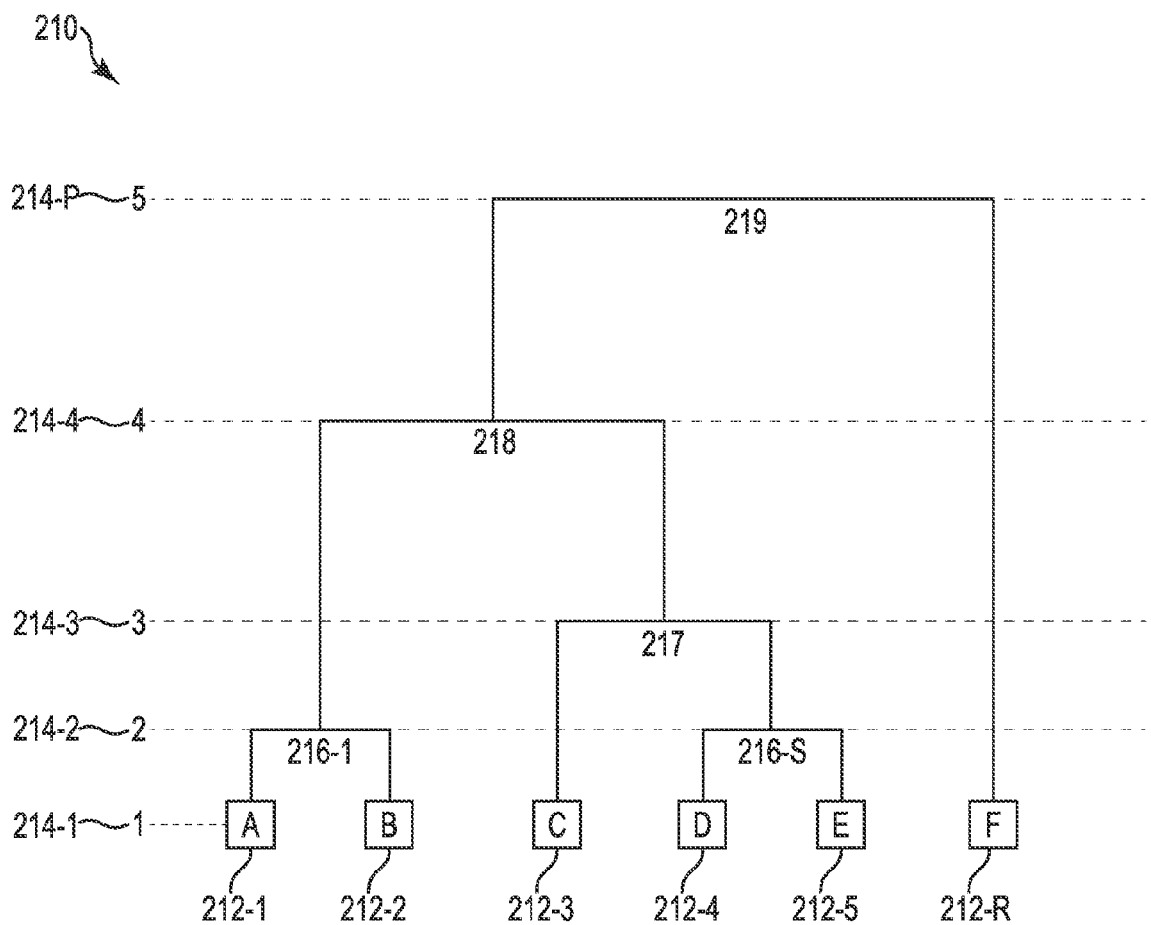
FIG. 2 illustrates an example of cluster levels according to the present disclosure.

FIG. 2 illustrates an example of cluster levels 210 according to the present disclosure.

The cluster levels 210 can include a number of increasing levels 214-1, ..., 214-P, wherein each higher level includes more CIs then the level below. For example, level 5 214-P includes more CIs (e.g., CIs A 212-1, B 212-2, C 212-3, D 212-4, E 212-5, and F 212-R) than level four 214-4 (e.g., includes CIs A 212-1, B 212-2, C 212-3, D 212-4, and E 212-5). As an example, the cluster levels can include 5 levels. However, the number of cluster levels in examples of the present disclosure are not limited to a particular number of cluster levels.

A first level 214-1 can include a single CI 212-1, ..., 212-R in each cluster. Thereby, a cloud system with six CIs can include six clusters at the first level 214-1. A second level 214-2 can include two clusters 216-1, 216-S. A first cluster in the second level 216-1 can contain CI A 212-1 and CI B 212-2, whereby CI A 212-1 and CI B 212-2 are more related to one another based on the proximity relationship than CI A 212-1 and CI C 212-3 and/or CI B 212-2 and CI C 212-3. A second cluster in the second level 216-S can contain CI D 212-4 and CI E 212-5, whereby CI D 212-4 and CI E 212-5 are more related to one another based on the calculated relationship than CI C 212-3 and CI D 212-4 and/or CI C 212-3 and CI E 212-5.

A third level 214-3 can contain one cluster 217. The cluster 217, in the example, can contain CIs C 212-3, D 212-4, and E 212-5; whereby CI C 212-3 is more related to CI D 212-4 and CI E 212-5 based on the calculated relationship than CI C 212-3 is related CI A 212-1. A fourth level 214-4 can contain one cluster 218. The cluster 218 can contain CIs A 212-1, B 212-2, C 212-3, D 212-4, and E 212-5. The CIs in the fourth level can be more related to one another based on the calculated relationship than the CIs in the fourth level are to a CI not in the fourth level (e.g., CI F 212-R). A fifth level 214-P and/or the highest level can include one cluster 219 (e.g., a highest cluster). The highest cluster 219, for example, can include all of the number of CIs 212-1, ..., 212-R in the cloud system.

In a number of examples of the present disclosure, the number of CIs 212-1, ..., 212-R can be assigned to a number of management cloud servers by determining a cluster level among the number of cluster levels with the most CIs capable of being assigned to a management cloud server. For example, the capacity of a management cloud server can be compared to a management event rate of the number of cluster levels. The cluster level with the most CIs that is within a threshold of the capacity of the management cloud server can be assigned to the management cloud server. A threshold capacity can include a management event rate that is equal to or less then the capacity of the management cloud server (e.g., management event capacity), for example.

An example management event rate (e.g., total management event rate) for a number of cluster levels can include the following:

| Cluster | Management Event Rate |
| --- | --- |
| Level Five 219 | 850 |
| Level Four 218 | 800 |
| Level Three 217 | 500 |
| Level 2, First Cluster 216-1 | 300 |
| Level 2, Second Cluster 216-S | 400 |
| Level 1, Cl A 212-1 | 100 |
| Level 1, Cl B 212-2 | 200 |
| Level 1, Cl C 212-3 | 100 |
| Level 1, Cl D 212-4 | 250 |
| Level 1, Cl E 212-5 | 150 |
| Level 1, Cl F 212-R | 50 |

For example, the cluster 219 on level 5 214-P can include a total management event rate for all CIs in the cluster 219 (e.g., CIs 212-1, ..., 212-R) of 850. A management event rate of 850, for example, can include the historical average management event rate of all CIs in the cluster 219. However, the examples of the present disclosure are not limited to a particular event rate for each cluster (e.g., not limited to the management event rates as shown). A management cloud server with a capacity of a 600 management event rate can be assigned a cluster level from a top down approach (e.g., from level five to level one). For example, the management cloud server can be assigned level three cluster 217 with a total management event rate of 500 and can have a remaining capacity of 100 management event rate to be assigned out.

In some examples of the present disclosure, the number of CIs 212-1, ..., 212-R can be reassigned in response to a new management cloud server in the cloud system. For example, a new management cloud server can be added to the system by creating a new virtual machine with a process server (e.g., management cloud server). The virtual machine, for instance, can be created by an IT personnel and/or automatically created by the system. For example, creating a virtual machine can include deploying the virtual machine. In response to a new management cloud server being added, the number of CIs 212-1, ..., 212-R can be reassigned to a revised number of management cloud servers, wherein the revised number of management cloud servers includes the new management cloud server.

In some examples of the present disclosure, the number of CIs 212-1, ..., 212-R can be reassigned in response to removing a management cloud server in the cloud system. For example, the number of CIs 212-1, ..., 212-R can be automatically reassigned to a revised number of management cloud servers in response to one of the number of management cloud servers being removed, wherein the revised number of management cloud servers does not include the removed management cloud server.

In various examples of the present disclosure, the relationship between the number of CIs 212-1, . . . , 212-R can be recalculated. For example, the relationship between the number of CIs 212-1, . . . , 212-R can be automatically recalculated periodically (e.g., hourly, daily, weekly, and monthly), randomly, and/or in response to added and/or removed CIs in the cloud system. An added can include a new CI in the cloud system and a removed CI can include a CI among the number of CIs being removed, for example.

Figure 3:
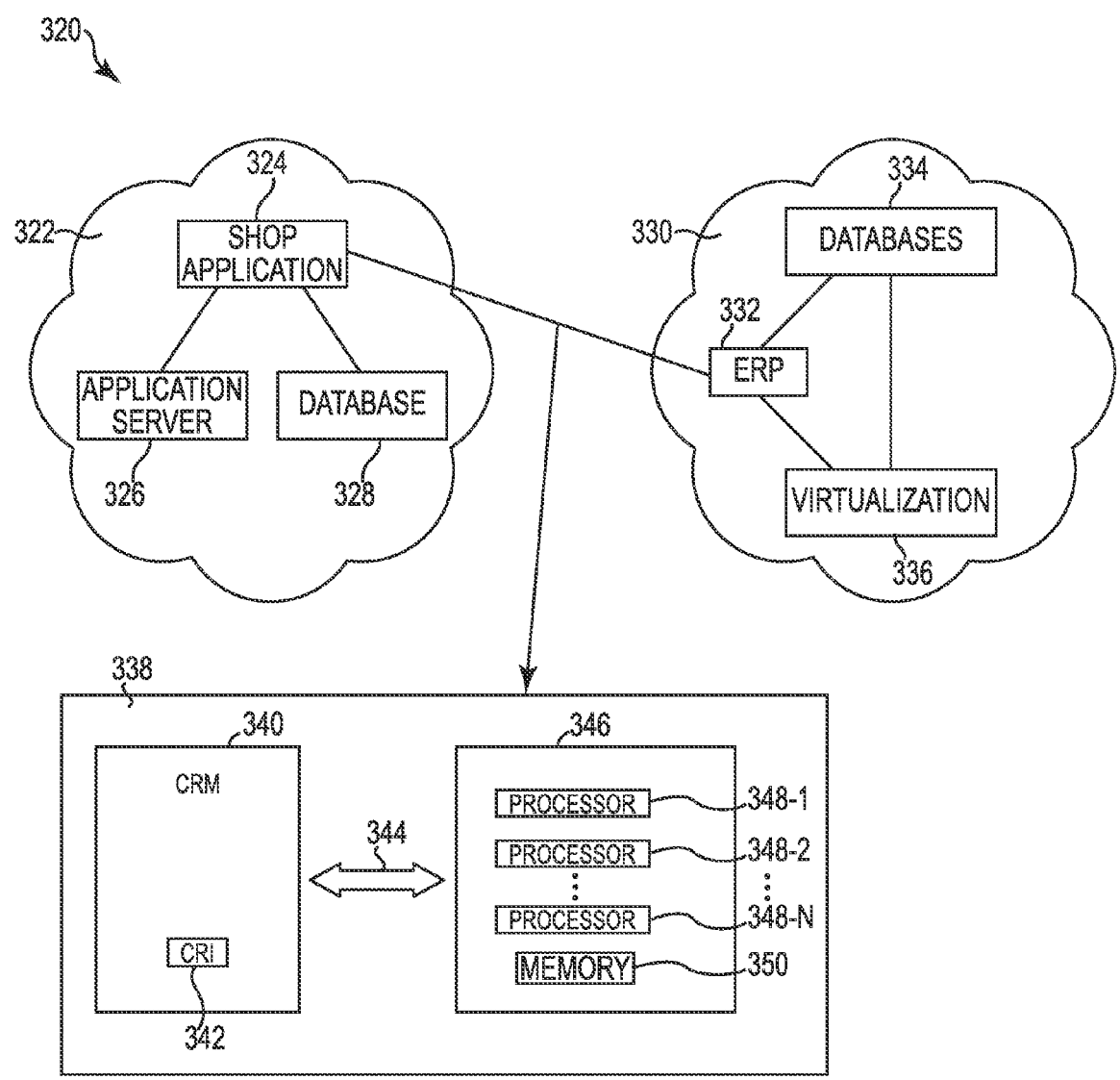
FIG. 3 illustrates a block diagram of an example system for balancing management duties in a cloud system according to the present disclosure.

FIG. 3 illustrates a block diagram of an example system 320 for balancing management duties in a cloud system according to the present disclosure. The system 320 can be used to balance management duties in a cloud system across a number of management cloud servers.

The system 320 can include a public cloud system 322 and a private cloud system 330. For example, an environment (e.g., IT environment) including a public cloud system 322 and a private cloud system 330 can include a hybrid environment and/or a hybrid cloud. A hybrid cloud, for example, can include a mix of traditional server systems and dynamic cloud services. For instance, a hybrid cloud can involve inter dependencies between physically and logically separated services consisting of multiple systems. A hybrid cloud, for example, can include a number of clouds (e.g., two clouds) that can remain unique entities but can be bound together.

A public cloud system 322, for example, can include shop application 324, application server 326, and a database 328. A public cloud system 322 can include a service provider that makes resources (e.g., applications and storage), available to the public over the Internet. A public cloud system 322 can be free or offered for a fee, for example. For instance, a shop application 324 can include the number of resources available to the public over the Internet. A user can access a cloud-based application through the shop application 324 (e.g. Internet browser). An application server 326 in a public cloud system 322 can include a virtual machine and/or a cloud resource offered. A database 328 in a public cloud system 322 can include a database that runs on a cloud computing platform and/or can include a cloud resource offered.

A private cloud system 330, for example, can include an Enterprise Resource Planning (ERP) system 332, a number of databases 334, and virtualization 336 (e.g., virtual machines). For instance, a private cloud system 330 can include a computing architecture that provides hosted services to a limited number of nodes (e.g., computer) behind a firewall. The ERP 332, for example, can integrate internal and external management information across an entire enterprise and/or organization. A number of databases 334 can include an event database, event archive, CMDB, and/or a performance metric database, for example. Virtualization 336, for example, can include the creation of a number of virtual resources, such as a hardware platform, operating system, storage device, and/or network resource, among others.

The public cloud system 320 and the private cloud system 330 can be bound together, for example, through the shop application 324 in the public cloud system 320 and the ERP 332 in the private cloud system 330.

The system 320 can include a management computing device 338 (e.g., IT computing device, system computing device, and manufacturing computing device) having a memory and processing resources with instructions (e.g., computer-readable instructions (CRI) 342) stored in the memory and executed by the processing resources to balance management duties in a cloud system. As described herein, the management computing device 338 can be any combination of hardware and/or program instructions (e.g., CRI) configured to balance management duties in a cloud system. The hardware, for example, can include one or more processing resources 348-1, 348-2 . . . 348-N, computer readable medium (CRM) 340, etc. The program instructions can include instructions stored on the CRM 340 that are executable by the one or more processing resources to implement one or more of the various functions, or specific acts described herein (e.g., calculate a relationship between a number of configuration items (CI) using an event archive).

Figure 4:
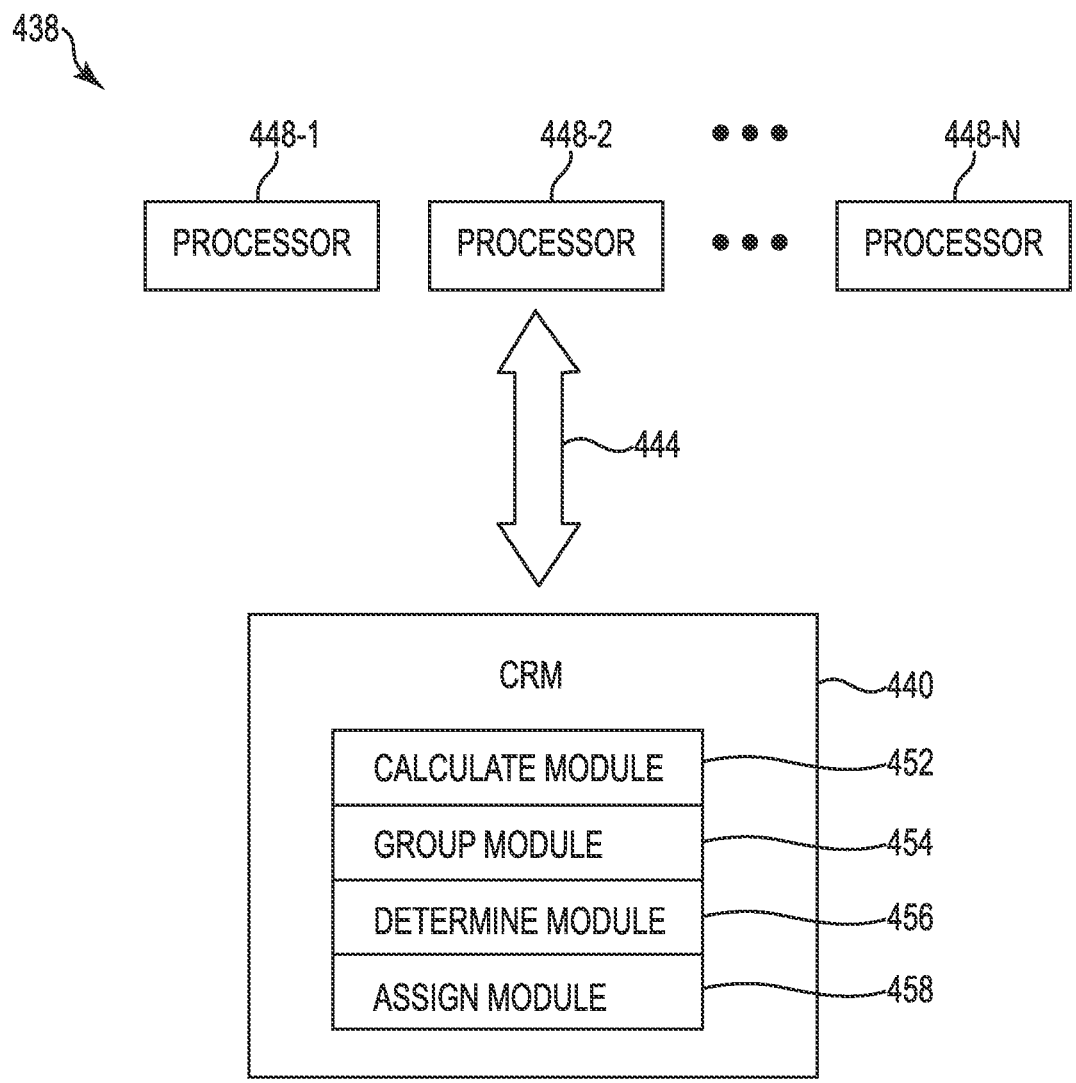
FIG. 4 illustrates a diagram of an example computing system for balancing management duties in a cloud system according to the present disclosure.

The management computing device 338 can include the CRM 340 in communication with the processing resources 348-1, 348-2 . . . 348-N. CRM 340 can be in communication with a computing device 346 (e.g., a Java® application server, among others) having processing resources of more or fewer than 348-1, 348-2 . . . 348-N. The computing device 346 can be in communication with a tangible non-transitory CRM 340 storing a set of computer-readable instructions (CRI 342) executable by one or more of the processing resources 348-1, 348-2 . . . 348-N, as described herein. The CRI 342 can also be stored in remote memory managed by a server and represent an installation package that can be downloaded, installed, and executed. The CRI 342, for example, can include a number of modules as shown in FIG. 4 (e.g., 452, 454, 456, and 458). The computing device 346 can include memory resources 350, and the processing resources 348-1, 348-2 . . . 348-N can be coupled to the memory resources 350.

Processing resources 348-1, 348-2 . . . 348-N can execute CRI 342 that can be stored on an internal or external non-transitory CRM 340. The processing resources 348-1, 348-2 . . . 348-N can execute CRI 342 to perform various functions, including the functions described in the method 100. For example, the processing resources 348-1, 348-2 . . . 348-N can execute CRI 342 to balance management duties in a cloud system. A non-transitory CRM (e.g., CRM 340), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 340 can be integral, or communicatively coupled, to the computing device 346, in a wired and/or a wireless manner. For example, the non-transitory CRM 340 can be an internal memory, a portable memory, a portable disk, or a memory associated with another computing resource.

The CRM 340 can be in communication with the processing resources 348-1, 348-2 . . . 348-N via a communication path 344. The communication path 344 can be local or remote to a machine (e.g., a computing device 346) associated with the processing resources 348-1, 348-2 . . . 348-N. Examples of a local communication path 344 can include an electronic bus internal to a machine (e.g., a computer) where the CRM 340 is one of volatile, non-volatile, fixed, and/or removable storage medium in communication with the processing resources 348-1, 348-2 . . . 348-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 344 can be such that the CRM 340 is remote from the processing resources e.g., 348-1, 348-2 ... 348-N, such as in a network connection between the CRM 340 and the processing resources (e.g., 348-1, 348-2 ... 348-N). That is, the communication path 344 can be a network connection. Examples of such a network connection can include a local area network (LAN), wide area network (WAN), personal area network (PAN), and the Internet, among others. In such examples, the CRM 340 can be associated with a first computing device and the processing resources 348-1, 348-2 ... 348-N can be associated with a second computing device (e.g., computing device 346). For example, processing resources 348-1, 348-2 ... 348-N can be in communication with a CRM 340, wherein the CRM 340 includes a set of instructions and wherein the processing resources 348-1, 348-2 ... 348-N are designed to carry out the set of instructions to balance management duties in a cloud system.

The processing resources 348-1, 348-2 ... 348-N coupled to the memory resources 350 can execute program instructions to enable the management computing device 338 to calculate a relationship between a number of configuration items (CI) using an event archive and group the number of CIs into a number of cluster levels based on the relationship. The closer the relationship (e.g., proximity relationship) of the CIs, for instance, the closer the CIs can be placed in a cluster level. For example, a first CI and a second CI with a closer relationship (e.g., proximity relationship) than the relationship of a first CI and a third CI can be placed in a closer cluster than the first CI and the third CI. In some examples of the present disclosure, a relationship between the number of CIs can be calculated using an event archive and a CMDB.

The cluster levels can include a number of increasing levels, wherein each level includes more CIs then the level below. The processing resources 348-1, 348-2 ... 348-N coupled to the memory resources 350 can execute program instructions to enable the management computing device 338 to determine a management event rate (e.g. total management event rate) for each of the number of cluster levels. To balance management duties in the cloud system, the processing resources 348-1, 348-2 ... 348-N coupled to the memory resources 350 can execute program instructions to enable the management computing device 338 to assign the number of CIs to a number of management cloud servers based on the management event rate for each of the number of cluster levels and a capacity of the number of management cloud servers.

In various examples of the present disclosure, the processing resources 348-1, 348-2 ... 348-N coupled to the memory resources 350 can execute program instructions to enable the management computing device 338 to determine a cluster level among the number of cluster levels with the most CIs to assign to a management cloud server, wherein the cluster level to be assigned has a management event rate that is within a threshold of the capacity of the management cloud server. For example, a threshold can include an amount that is equal to or less then the capacity of the management cloud server.

In some examples of the present disclosure, the processing resources 348-1, 348-2 ... 348-N coupled to the memory resources 350 can execute program instructions to enable the management computing device 338 to reassign the number of CIs to a revised number of management cloud servers in response to a new management cloud server in the cloud system 322, 330. For instance, a new management cloud server can be automatically created and/or deployed in the cloud system 322, 330 in response to the workload being too high for the number of management cloud servers in the cloud system 322, 330 (e.g., a total management event capacity of the number of management cloud servers is less than a management event rate to manage the number of CIs). The revised number of management cloud servers, for example, can include the new management cloud server.

In various examples of the present disclosure, the processing resources 348-1, 348-2 ... 348-N coupled to the memory resources 350 can execute program instructions to enable the management computing device 338 to reassign the number of CIs to a revised number of management cloud servers in response to one of the number of management cloud services being removed. For instance, an associated management cloud server can be automatically be removed in the cloud system 322, 330 in response to a total management event capacity of the number of management cloud servers being more than a management event rate to manage the number of CIs. The revised number of management cloud servers, for example, can not include the removed management cloud server.

In some examples of the present disclosure, the processing resources 348-1, 348-2 ... 348-N coupled to the memory resources 350 can execute program instructions to enable the management computing device 338 to recalculate the relationship of a number of CIs using an event archive. For instance, based on the recalculated relationship, the number of CIs can be regrouped into a number of cluster groups. The recalculation can be in response to a CI in the cloud system 322, 330 being added and/or removed, and periodically (e.g., every hour, day, week, and month). Recalculating the relationship, for instance, can include recalculating a management event rate to manage the number of CIs. For instance, a management cloud server in response to the recalculated relationship can be removed, created, and/or reassigned duties based on the recalculated management event rate.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing.

FIG. 4 illustrates a diagram of an example computing system 438 for balancing management duties in a cloud system according to the present disclosure. The computing system 438 can comprise a processing resource 448-1. 448-2 ... 448-N. The processing resource 448-1, 448-2 ... 448-N can, for example, include the processing resources 348-1, 348-2 ... 348-N described in FIG. 3.

The processing resource 448-1, 448-2 ... 448-N can be communicatively coupled to a CRM 440 via a communication path 444. The CRM 440 can be similar to CRM 340 described in FIG. 3. The CRM 440 can include a number of modules 452, 454, 456, and 458. The number of modules can include CRI that can be executed, for example, by the processing resource 448-1, 448-2 ... 448-N to perform a number of functions.

A calculate module 452 can, for example, include a number of CRI executable by the processing resource 448-1, 448-2 ... 448-N to perform or achieve the particular act or carry out the act of calculating a number of proximity relationships between a number of CIs using an event archive and a CMDB. For example, a proximity relationship between a first CI and a second CI can include a percentage of correlated events between the first CI and the second CI and a number of hops between the first CI and the second CI. For instance, the percentage of correlated events can be calculated using an event archive and the number of hops can be calculated using a CMDB.

The calculate module 452, in some examples of the present disclosure, can recalculate the number of proximity relationships between the number of CIs. The recalculation, for instance, can automatically occur periodically, randomly, and/or in response to a CI being added and/or removed. For example, the recalculation of the proximity relationships can result in a reassignment of the number of CIs to a number of management cloud servers and automatic creation and/or removal of a management cloud server.

A group module 454 can include a number of instructions that can be executed by the processing resource 448-1, 448-2 . . . 448-N. For example, the group module 454 can group the number of CIs into a number of cluster levels based on the number of proximity relationships calculated by the calculate module 452.

A determine module 456 can include a number instructions that can be executed by the processing resource 448-1, 448-2 . . . 448-N. For example, the determine module 456 can determine a management event rate (e.g., total management event rate) for each of the number of cluster levels using the event database and can determine a management event capacity for each of a number of management cloud servers.

An assign module 458 can include a number of instructions that can be executed by the processing resource 448-1, 448-2 . . . 448-N. For example, the assign module 458 can assign the number of CIs to the number of management cloud servers based on a comparison of the management event rate for the number of cluster levels and a management event capacity of the number of management cloud servers in order to balance management duties in the cloud system.

In some examples of the present disclosure, the assign module 458 can include instructions to assign a threshold number of CIs to each of the number of management cloud servers. A threshold number (e.g., 500) can include all CIs in a cluster level.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for balancing management duties in a cloud system comprising:
    determining a proximity relationship between a number of configuration items (CI) in a cloud system, wherein a proximity relationship between a first CI and a second CI includes:
        a percentage of correlated management events between the first CI and the second CI; and
        a number of hops between the first CI and the second CI;
    grouping the number of CIs into a number of cluster levels based on the proximity relationship of the number of CIs; and
    assigning one of the number of cluster levels to a management cloud server based on a capacity of the management cloud server in order to balance management duties in the cloud system.

2. The method of claim 1,
    wherein assigning the one cluster level includes distributing management events of the related CIs to the management cloud server.

3. The method of claim 1, further including creating a virtual machine with a new management cloud server, in response to determining a total management event capacity of the number of management cloud servers is less than a management event rate to manage the number of CIs.

4. The method of claim 1, further including removing a virtual machine with an associated management cloud server, in response to determining a total management event capacity of the number of management cloud servers is more than a management event rate to management the number of CIs.

5. The method of claim 1, further including:
    calculating a total management event rate for each of the number of cluster levels to assign the cluster level with the highest rate to the management cloud server; and
    wherein the highest rate of the assigned cluster level is less than the capacity of the management cloud server.

6. A non-transitory computer-readable medium storing a set of instructions executable by a processor to cause a computer to:
    calculate a proximity relationship between a number of configuration items (CI) using an event archive, wherein a proximity relationship between a first CI and a second CI includes:
        a percentage of correlated management events between the first CI and the second CI; and
        a number of hops between the first CI and the second CI;
    group the number of CIs into a number of cluster levels based on the proximity relationship;
    determine a management event rate for each of the number of cluster levels; and
    assign the number of CIs to a number of management cloud servers based on a comparison of the management event rate for each of the number of cluster levels and a capacity of the number of management cloud servers to balance management duties.

7. The medium of claim 6, further comprising instructions to:
    determine a cluster level among the number of cluster levels with the most CIs to assign to the management cloud server; and
    wherein the cluster level to be assigned has a management event rate within a threshold of a management event capacity of the management cloud server.

8. The medium of claim 7, wherein the threshold includes an amount that is equal to or less than the management event capacity of the management cloud server.

9. The medium of claim 6, further comprising instructions to periodically recalculate the proximity relationship between the number of CIs using the event archive.

10. The medium of claim 6, further comprising instruction to recalculate the proximity relationship between the number of CIs using the event archive in response to at least one of a new CI being added and a CI among the number of CIs being removed.

11. The medium of claim 7, further comprising instructions to:
    reassign the number of CIs to a revised number of management cloud servers in response to a new management cloud server in the cloud system; and
    wherein the revised number of management cloud servers includes the new management cloud server.

12. The medium of claim 7, further comprising instructions to:
reassign the number of CIs to a revised number of management cloud servers in response to one of the number of management cloud servers being removed; and
wherein the revised number of management cloud servers does not include the removed management cloud server.

13. A system for balancing management duties in a cloud system, the system comprising:
a processing resource in communication with a non-transitory computer readable medium, wherein the non-transitory computer readable medium includes a set of instructions and wherein the processing resource executes the set of instructions to:
calculate a number of proximity relationships between a number of configuration items (CI) using an event archive and a Configuration Management Database (CMDB), wherein a proximity relationship between a first CI and a second CI includes:
a percentage of correlated management events between the first CI and the second CI; and
a number of hops between the first CI and the second CI;
group the number of CIs into a number of cluster levels based on the calculated number of proximity relationships;
determine a management event rate for each of the number of cluster levels using the event archive;
determine a management event capacity for each of a number of management cloud servers; and
assign the number of CIs to the number of management cloud servers based on a comparison of the management event rate for the number of cluster levels and the management event capacity of the number of management cloud servers in order to balance management duties in the cloud system.

14. The system of claim 13, wherein a management event capacity includes a management event rate a management cloud server is capable of processing.

15. The system of claim 13, further including instructions to assign a threshold number of CIs to each of the number of management cloud servers.

* * * * *